US011328347B2

(12) United States Patent
Lim et al.

(10) Patent No.: US 11,328,347 B2
(45) Date of Patent: May 10, 2022

(54) RENTAL ASSET PROCESSING FOR BLOCKCHAIN

(71) Applicant: International Business Machines Corporation, Armonk, NY (US)

(72) Inventors: Alan Kang Hong Lim, Singapore (SG); Ying Kiat Jonathan Declan Tan, Singapore (SG)

(73) Assignee: International Business Machines Corporation, Armonk ( * ) Notice: Subject to any disclaimer, the term of this patent is extended or adjusted under 35 U.S.C. 154(b) by 287 days.

(21) Appl. No.: 16/021,679

(22) Filed: Jun. 28, 2018

(65) Prior Publication Data

US 2020/0005388 A1   Jan. 2, 2020

(51) Int. Cl.
*G06Q 30/06* (2012.01)
*H04L 9/32* (2006.01)

(52) U.S. Cl.
CPC ....... *G06Q 30/0645* (2013.01); *H04L 9/3247* (2013.01); *H04L 2209/38* (2013.01)

(58) Field of Classification Search
CPC .............. G06Q 30/0645; H04L 9/3247; H04L 2209/38
See application file for complete search history.

(56) References Cited

U.S. PATENT DOCUMENTS

| 10,491,578 B1 * | 11/2019 | Hebert | H04L 9/001 |
| 10,833,843 B1 * | 11/2020 | Vijayvergia | H04L 9/3242 |
| 2002/0156645 A1 | 10/2002 | Hansen | |
| 2015/0106292 A1 | 4/2015 | Robinson et al. | |
| 2015/0186840 A1 | 7/2015 | Torres et al. | |
| 2016/0261690 A1 | 9/2016 | Ford | |
| 2017/0046693 A1 * | 2/2017 | Haldenby | G06Q 40/08 |
| 2017/0046806 A1 * | 2/2017 | Haldenby | G06Q 10/08 |
| 2017/0243025 A1 * | 8/2017 | Kurian | G06Q 40/00 |
| 2018/0089436 A1 * | 3/2018 | Smith | G06F 21/575 |
| 2018/0191714 A1 * | 7/2018 | Jentzsch | H04L 63/126 |
| 2018/0285839 A1 * | 10/2018 | Yang | G06Q 20/0655 |
| 2018/0314539 A1 * | 11/2018 | Vyas | G06F 9/45558 |
| 2018/0315309 A1 * | 11/2018 | Becker | H04L 9/0643 |
| 2018/0322597 A1 * | 11/2018 | Sher | H04L 67/22 |
| 2018/0349621 A1 * | 12/2018 | Schvey | H04L 9/0637 |

(Continued)

FOREIGN PATENT DOCUMENTS

CN   107194778 A  *  9/2017

OTHER PUBLICATIONS

Preuveneers, D., Joosen, W. and Ilie-Zudor, E., "Trustworthy data-driven networked production for customer-centric plants", 2017, Industrial Management & Data Systems, vol. 117 No. 10, pp. 2305-2324. (Year: 2017).*

(Continued)

*Primary Examiner* — Sarah M Monfeldt
*Assistant Examiner* — Michael J. Monaghan

(57) ABSTRACT

An example operation may include one or more of determining, by a first blockchain node, a need for a rental asset unable to be provided by the first blockchain node, requesting use of the rental asset from a second blockchain node controlling the rental asset, reserving, by the second blockchain node, the rental asset, utilizing the rental asset, designating the rental asset as in-use, and in response to the rental asset no longer being in-use. returning control of the rental asset to the second blockchain node.

15 Claims, 12 Drawing Sheets

(56) References Cited

U.S. PATENT DOCUMENTS

| | | | | |
|---|---|---|---|---|
| 2019/0190896 | A1* | 6/2019 | Singh | H04L 63/20 |
| 2019/0259093 | A1* | 8/2019 | Turato | G06Q 30/0645 |
| 2019/0325522 | A1* | 10/2019 | Bathia | G06K 9/00624 |
| 2019/0340269 | A1* | 11/2019 | Biernat | G06F 16/248 |
| 2019/0354945 | A1* | 11/2019 | Mahajan | G06Q 20/381 |
| 2020/0211005 | A1* | 7/2020 | Bodorik | G06Q 10/00 |

OTHER PUBLICATIONS

Yes Bank, Yes Bank Partners Smartbox to Solve Last Mile Delivery Challenge for E- Commerce Companies, Feb. 8, 2016, Refer to p. 1-2.

\* cited by examiner

150

650

RENTAL ASSET PROCESSING FOR BLOCKCHAIN

TECHNICAL FIELD

This application generally relates to blockchain networks, and more particularly, to rental asset processing for a blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

Conventionally, asset rentals are limited by difficulties in sharing rental assets, which leads to increased prices and lack of responsiveness. As such, what is needed is a system for efficiently identifying and providing remote rental assets in order to overcome these limitations.

SUMMARY

One example embodiment may provide a method that includes one or more of determining, by a first blockchain node, a need for a rental asset unable to be provided by the first blockchain node, requesting use of the rental asset from a second blockchain node controlling the rental asset, reserving, by the second blockchain node, the rental asset, utilizing the rental asset, designating the rental asset as in-use, and in response to the rental asset no longer being in-use. returning control of the rental asset to the second blockchain node.

Another example embodiment may provide a system that includes a private blockchain network, which includes a first and a second blockchain node. The first blockchain node is configured to determine a need for a rental asset unable to be provided by the first blockchain node and send a request to use the rental asset to the private blockchain network. The second blockchain node is configured to control the rental asset, receive the request to use the rental asset, and determine the rental asset is available, and in response reserve the rental asset. In response to the second blockchain node reserves the rental asset, the first blockchain node is further configured to designate the rental asset as in-use and in response to the rental asset no longer is in-use, the first blockchain node returns control of the rental asset to the second blockchain node.

A further example embodiment may provide a non-transitory computer readable medium comprising instructions, that when read by a processor, cause the processor to perform one or more of determining, by a first blockchain node, a need for a rental asset unable to be provided by the first blockchain node, requesting use of the rental asset from a second blockchain node controlling the rental asset, reserving, by the second blockchain node, the rental asset, utilizing the rental asset, designating the rental asset as in-use, and in response to the rental asset no longer being in-use returning control of the rental asset to the second blockchain node.

DETAILED DESCRIPTION

Figure 1A:
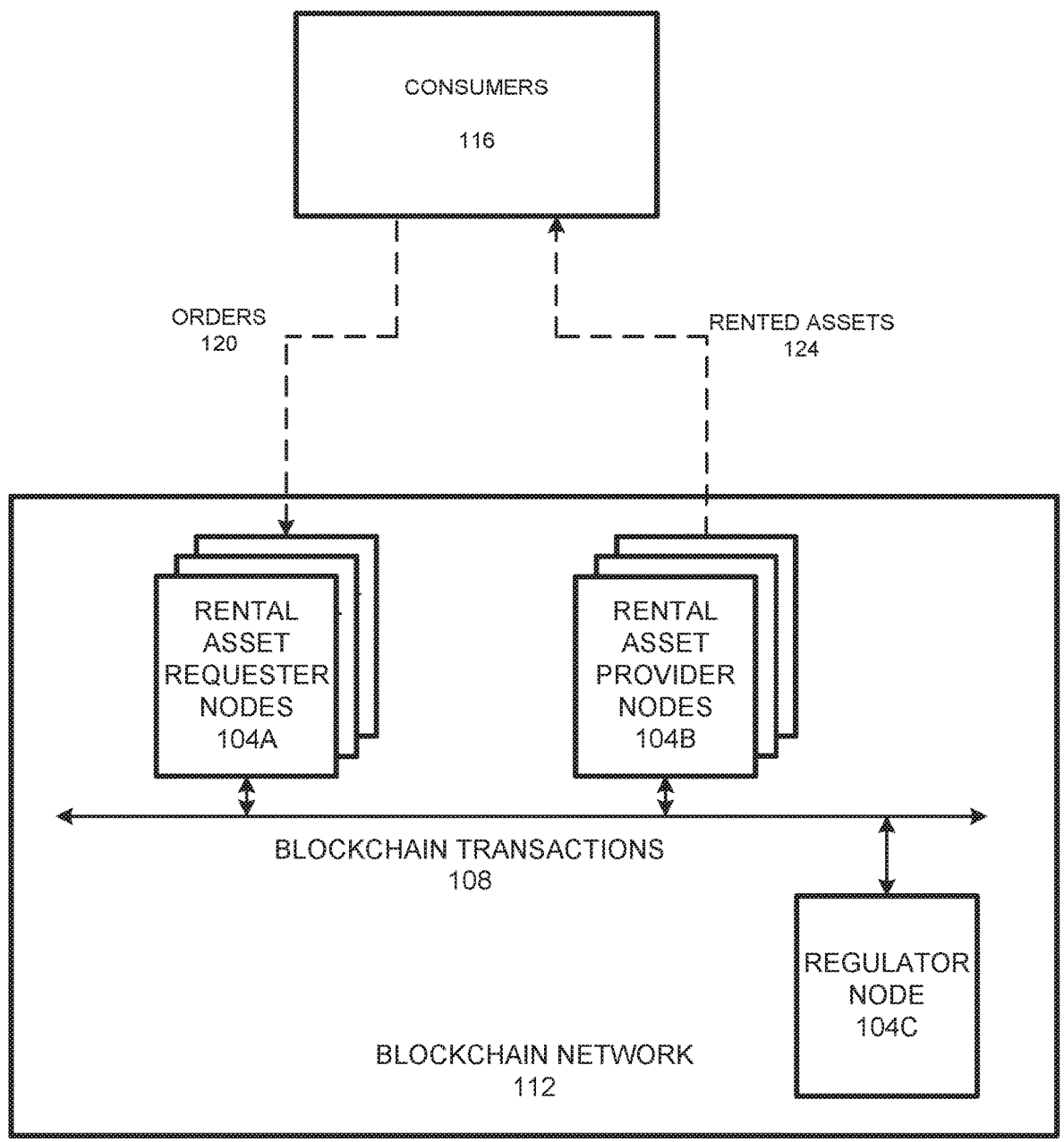
FIG. 1A illustrates a network diagram of a system for sharing rental assets with a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling. Example embodiments provide methods, systems, non-transitory computer readable media, devices, and/or networks, which provide rental asset processing for blockchains.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node that can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction that normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database, which maintains a current state of the blockchain. There is typically one ledger per channel. Each peer node maintains a copy of the ledger for each channel of which they are a member.

A chain is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The example embodiments are directed to methods, devices, networks, non-transitory computer readable media and/or systems, which support a blockchain solution for managing rental assets. More specifically, the present application provides a blockchain-based rental model for sharing rental assets while preserving confidentiality.

Some of the benefits of such a solution include enabling competitive asset rental providers to collaborate with each other for asset rental in a trusted manner. The competitive nature of business often makes it difficult to find a trusted third party to broker and record transactions. The present application enables competitors to do so, without revealing business confidential information including sensitive supplier and customer data to third parties. The present application provides rental asset requester nodes, rental asset provider nodes, and regulator nodes—each of which are blockchain nodes. The present application uniquely allows initiation of rental transactions from either within a blockchain network (by a rental asset requester node), or from outside a blockchain network (by a consumer).

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the rental asset management system of the present application is implemented due to immutability/accountability, smart contracts, security, privacy, decentralization, consensus, and endorsement—which are inherent and unique to blockchain. In particular, with respect to immutability/accountability, information about rental asset booking is recorded on the blockchain by both the asset borrower as well as the asset provider, consistently. The shared ledger captures data (e.g. facility info, booking info) needed by the process of facility booking, management, and retrieval, and records all transactions. These transactions are stored as immutable blocks added to the blockchain. This ensures no unilateral alteration of the booking is possible by one party. The blockchain maintains a history of the asset lifecycle, including the initial setup, booking, return and destruction of the asset. This minimizes disputes between transacting parties, facilities audit or investigation.

With respect to smart contracts, the contracts define the conditions for booking such as price, quantity, and duration of the booking. Both the asset provider as well as the asset borrower mutually agree to this. The solution introduces the concept of a dynamic pricing plan for asset rentals. Pricing plan here refers to a contractual price and method for an asset provider to rent out an asset to a lessee or a buyer of the service. By modeling the pricing rules as Smart Contracts (a.k.a. chaincode)—codifies the rules associated with rentals. Asset providers could write and submit their own pricing plans as smart contracts for managing the terms and conditions for renting out an asset based on blockchain network utilization levels. For example, blockchain network utilization could be computed based on a number of specific assets booked, divided across a class of assets that are available for booking. So this takes into account the capacity of individual asset providers as well as the overall blockchain network capacity. Through this method, individual asset providers determine the price rather than a centralized arbitration engine. Each of the contracts are digitally signed which enables non-repudiation. The ability for individual asset provider to dictate their own pricing rules enables differentiation between providers in a competitive business network.

For example, in a scenario where construction companies A and B are both resource borrowers and providers of excavators, construction company A (acting as the resource borrower) needs to fulfill an obligation to its users but doesn't have sufficient excavators available. Company A decides to rent excavators from company B instead to cater for shortfall. For exemplary purposes, we assume that there are currently 500 units of a particular model of excavators available for rental within Singapore and currently less than 50% of these excavators are rented out. Company B could define a dynamic pricing scheme in the smart contract that stipulates that the rental price is now 50% of the reference price. The lower price may encourage Company A to rent the equipment from its competitors instead of turning away business due to the lack of availability to service their client. Consequently, when 50% of the excavator are rented out, the price of renting equipment goes up to the reference price. This helps the asset provider to improve their overall sales. The information of the total number of excavators and bookings are stored in a world state and may be retrieved by all blockchain network participants, while the actual booking details are hidden.

In another example, in a scenario where events companies A, B and C are all resource borrowers and providers of tents, event company A has an urgent need to fulfill obligations for an event but does not have sufficient tents. The blockchain network has currently 1000 units of a particular model of camping equipment are available for rental and currently less than 30% of the model of camping equipment are rented out. Company C charges a flat rate of $100 per day for rentals. Meanwhile, company B could define a pricing rule stipulating that the rental price is now $50 per day. The lower price may encourage company A to rent the equipment from company B instead of company C. Consequently, when a greater number of tents are rented out, company B could dynamically increase the price of rental to $100 per day. This helps the asset provider to improve their overall sales.

With respect to security, each participating member of the blockchain network, be it a borrower or an asset provider, will need to go through an enrollment process that could be facilitated by a certificate authority to establish their identity. The use of certificates provides identity verification for blockchain nodes.

With respect to privacy, the solution disclosed herein is designed such that only proof of the booking information (via hashes) are stored on the blockchain. Meanwhile, sensitive information such as personal data, supplier terms, and pricing are kept hidden and are only shared in a private database that is shared between a subset of parties on a need to know basis. This means that asset lenders will not be able to see the bookings that are made by their competitor's customers. This means that sensitive information such as customer name, supplier names, billing details etc are not revealed. What is captured and shared across the blockchain network is the aggregated view of the number of bookings made of a particular asset type and what is currently available. Meanwhile, a regulator or auditor node may be permissioned to see all transactions in the blockchain network, such as in the case of public safety where hazardous or contraband goods may be transmitted or for investigations into the identity of borrowers to ensure that they do not include individuals on denied party lists.

With respect to decentralized control and distributed aspects of blockchains, the information about the asset as well as the booking information is distributed across the blockchain network. The world state on the shared ledger will record the total number of assets that are in the system as well as the total quantity of particular assets that are currently booked. Participants in the blockchain network will maintain a copy of the record on their shared ledger. The information on the shared ledger is utilized to determine the current network rental asset capacity.

With respect to blockchain consensus, the solution disclosed herein utilizes consensus to ensure the order of the transactions as well as the execution of the contracts is enforced across the network.

One of the benefits of the example embodiments is an improvement of the functionality of a computing system by improving data security and limiting access to information to parties that have rights to the specific information. Through the blockchain solution described herein, a computing system can perform novel functionality by maintaining two independent states/ledgers. One includes private data and the other includes public data. Sensitive booking information (e.g. supplier, customer, or pricing details) is saved in the private state while a record of these private transactions is recorded as hashes on the blockchain. Blockchain peers or nodes which are not privy to the sensitive booking information will only store hashes. For example, company A (a resource borrower) and company B (a resource provider) may preserve information such as pricing details between themselves and a regulator node. They could record these on a private state. However, the rest of the participants/organizations in a blockchain network who are not a party to the transaction will only have access to the hash of the data on the blockchain.

The example embodiments provide numerous benefits over a traditional database. The drawbacks of a centralized system using a traditional database are threefold. First, a centralized asset booking management system requires competitive asset borrowers and providers to surrender information about bookings and potential sensitive partner relations to a centralized third party. Second, a centralized third party could be a single point of failure and subject to attacks or alteration of the records on the traditional database. Third, individual organizations will still need to maintain their own booking records and have this synchronized and reconciled with the booking information captured in the centralized database. This could be the subject of disputes, as there may be disparity between the two records. Meanwhile, if a traditional database is used to implement the example embodiments, the example embodiments would suffer from unnecessary drawbacks such as a lack of security for sensitive information. Accordingly, the example embodiments provide for a specific solution to a problem in the arts/field of providing rental asset processing for a blockchain.

FIG. 1A illustrates a network diagram of a system for sharing rental assets with a blockchain, according to example embodiments. Referring to FIG. 1A, the network 100 includes a blockchain network 112, including one or more rental asset requester nodes 104A that initiate blockchain transactions 108 to rent various rental assets. Rental assets may include a physical item, rental space, a service, or any other item that may be reserved for temporary or semi-temporary use. The blockchain network 112 may also include one or more rental asset provider nodes 104B. In some embodiments, the rental asset provider 104B is the owner of the rental assets. In other embodiments, other entities own the rental assets, but the rental asset provider nodes 104B allocate or provision the rental assets to the rental asset requester nodes 104A. In some embodiments, the blockchain network 112 includes one or more regulator nodes 104C, which oversee the blockchain transactions 108 and provide regulatory oversight.

The blockchain network 112 may also include other types of blockchain nodes 104 that are use-case specific, including merchant nodes, logistics providers, security providers, and so on. In the use case for online shopping, the end user (i.e. consumer 116) is out of the blockchain network 112. The online merchant or the delivery company (e.g. DHL) places a reservation/booking on a rental asset. In an apartment rental use case, the rental asset would be the apartment, rental asset providers 104B would be the apartment owners/landlords and the resource consumer 116 may be a tenant. A management company or apartment finding service 104A may act on behalf of the consumer 116 to book or request a rental asset (i.e. apartment).

In some embodiments, the user of the rental asset is not a blockchain node 104. Instead, the user is a consumer 116 outside the blockchain network 112 but part of network 100. Consumers 116 generate orders 120 for rental assets to one or more rental asset requester nodes 104A, which in turn generate the required blockchain transactions 108 to request and have access to rental assets. In one embodiment, after a rental asset provider node 104B allocates the rental asset, it provides rented assets 124 to consumers 116 as shown. In another embodiment, a rental asset provider node 104B provides rental assets to a rental asset requester node 104A, which in turn provides the rented asset 124 to a consumer 116. Following use of the rented asset 124, the consumer 116 may return the rented asset 124 either through the same rental asset requester node 104A or directly to the rental asset provider node 104B which sourced the rented asset 124. Each participating member of the blockchain network 112, be it a merchant, a rental asset requester 104A, a rental asset provider 104B, or a regulator node 104C will need to go through an enrollment process which could be facilitated by a certification authority to establish their unique identity.

One use case applies to parcel delivery scenarios. Last mile delivery is termed as the last leg of delivery of a parcel delivery to a consumer 116. In most cases, last mile delivery contributes significantly to the cost of delivery and impedes the growth of the online retail space. In urban areas, where the working population is typically not at home during office hours to receive a parcel, this can be especially challenging. Multiple trips may be required by couriers from third party logistics providers 104A before a successful home delivery is achieved. This adds up to a high cost of delivery and consequently third party logistics providers 104A and consumers 116 are increasingly looking to solutions like smart lockers. These lockers will enable couriers from third party logistics providers 104A to drop off packages at designated lockers without making another trip. Meanwhile, consumers 116 can pick up parcels at designated lockers at their convenience.

In the smart locker use case, third party logistics providers may be considered as rental asset requester nodes 104A, and smart locker providers may be considered to be rental asset provider nodes 104B. Smart lockers, while innovative, come with their own set of challenges. There is a limited mechanism to allow sharing of locker spaces between third party logistics providers 104A. The accessibility and reach of a third party logistics provider 104A may be limited to the smart lockers that they own or through a pre-arranged partner agreement with a different third party locker provider 104B. Third party logistics providers 104A and locker space providers 104B will need to cater for occasional and seasonal peaks by having additional locker space. This means that consequently, as an industry the utilization level may be very low. Given the highly competitive nature of the business and thin profit margins, third party logistics providers 104A may be protective about information with relation to pricing and relationships with their key merchants/suppliers and may be reluctant to grant access to client and transaction data related to any external entity. Hence, a centralized system that collects the information on customer information and associated parcel shipment may face issues with acceptance.

The above description presents fundamental concepts for a smart locker network. However, it does not address the problem of allowing competitive logistics and locker providers to share minimal amount of information yet allow them to cooperate for the common good of higher locker utilization and lowering the overall cost of parcel delivery.

A solution to this problem is to employ the use of a private, permissioned blockchain network 112 to enable competitive organizations such as third party logistics providers 104A and locker providers 104B to transact with each other in a secure, transparent manner while maintaining confidentiality of the business relations. Accounts may be set up individually between different logistics 104A and locker providers 104B, which may be onerous and difficult to track which entity has custody of parcels and at what time. Another solution is to provide a centralized locker management system but requires logistics 104A and locker providers 104B to give up information about bookings and potential sensitive partner relations to a centralized third party. However, this centralized third party could be a single point of failure. A third solution may be to employ the use of a private, permissioned blockchain, for example the Linux Foundation Hyperledger Fabric project to enable competitive organizations such as third party logistics 104A and locker providers 104B to transact with each other in a secure, transparent manner while maintaining confidentiality of business relations.

Figure 1B:
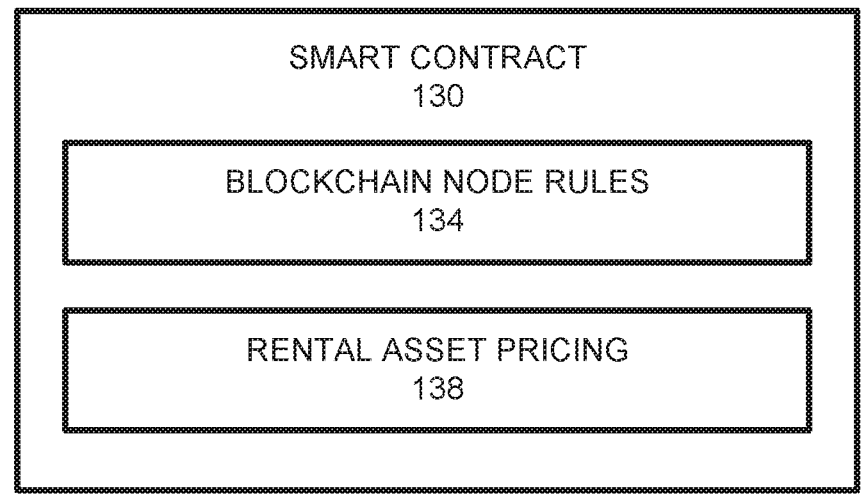
FIG. 1B illustrates a diagram of a smart contract and shared ledger in a blockchain, according to example embodiments.
Figure 1B:
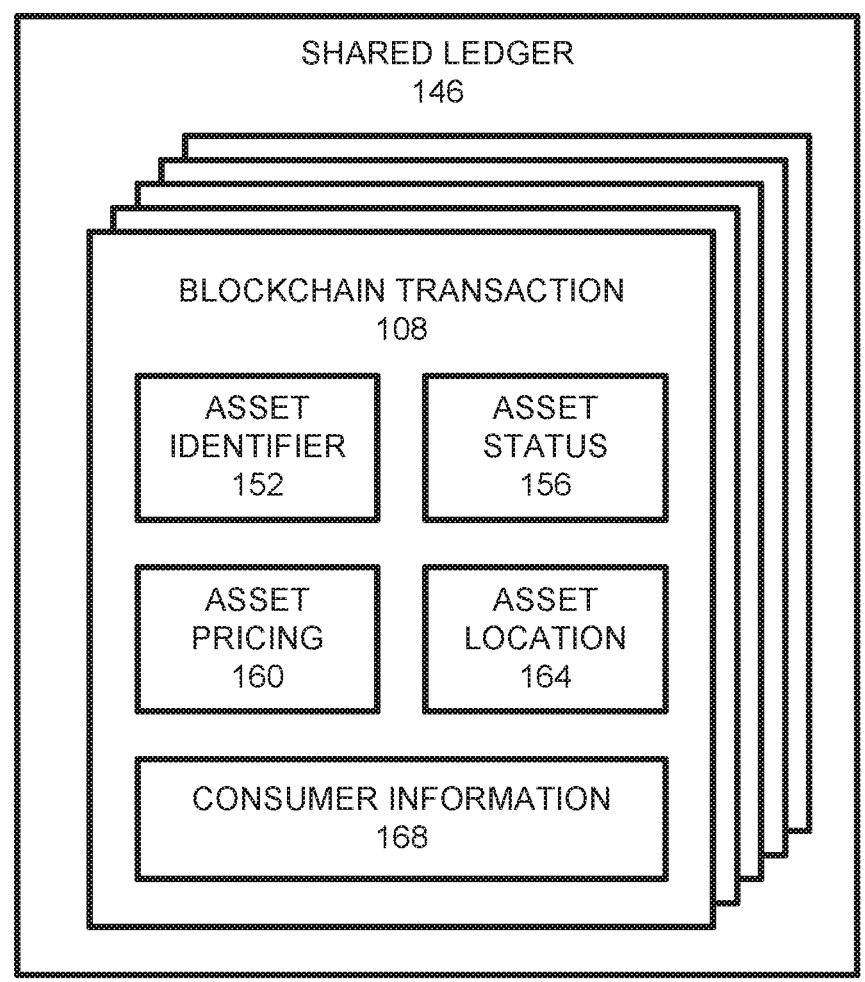

FIG. 1B illustrates a logic network diagram 150 of a smart contract and shared ledger in a blockchain, according to example embodiments. Each blockchain node 104 may have its own smart contract 130 that operates on the blockchain with its shared ledger 146. A shared ledger 146 contains data needed by the last mile delivery process (e.g., parcel info, shipment info in the package delivery use case) and records all blockchain transactions 108. All blockchain nodes 104 have access to the same shared ledger 146, but it is permissioned so blockchain network participants 104 may be restricted from seeing certain data. This means that competitive organizations which provide locker rental capability should not be able to see details such as the name and personal details (i.e. consumer information 168) of the end consumer 116 who purchased or ordered 120 the parcel, and the merchant details. Meanwhile a regulator node 104C may be permissioned to see all blockchain transactions 108 in the network 112, such as in the case of public safety where hazardous or contraband goods may be transmitted. Changes to the shared ledger 146 are stored as immutable blocks added to the blockchain so a history of the changes is always available, which facilitates audit or investigations. Each blockchain node 104 also includes the shared ledger 146, which stores blockchain transactions 108 of several types, and may include one or more of asset request transactions 426, asset reservation transactions 432, and rental asset in-use transactions 437. Blockchain transactions 108 may also include pricing changes to rental assets, transactions to add new rental assets, and transactions to remove rental assets. For the smart locker use case, blockchain transactions 108 may include any of placing a booking or reservation for a smart locker, depositing a parcel into a smart locker, or collecting a parcel from a smart locker.

Smart contract 130 codifies the blockchain node rules 134 associated with tasks of each blockchain node 104. It enforces who can do what and acts on the shared ledger 146. Once there is consensus by the other blockchain nodes 104, the blockchain transaction 108 is verified, and a new block is added to the blockchain. Individual locker providers 104B could write and submit their own rental asset pricing 138 or pricing rules 134 within smart contract 130 (e.g. rental rates could be dynamic and based on current utilization rate of smart lockers) for managing the terms and conditions for booking a locker or rental asset. This enables the automatic enforcement of booking and settlement of payment without the overheads of a centralized locker management system. With respect to dynamic pricing, having a common pricing template in a single smart contract 130 may simplify administration. However, further monetization may be possible when individual rental asset providers 104B may want to develop their own unique smart contract 130 to differentiate their offering from other rental asset providers 104B.

Smart contract 130 may also be used to enable notification to consumers 116 in the event of a successful booking without revealing the personal identifiable information 168 related to the end consumer 116.

There will be one or more facility/resource providers 104B and one more facility/resource consumers 104A (who places the bookings/reservations) and the regulator node 104C. The rental asset being tracked includes the state or status 156 of the physical asset—booked, in use, under maintenance etc. Rental asset ownership among blockchain nodes 104 to the consumer 116 may also be tracked as asset status 156 and asset location 164.

In order to achieve consensus between the different blockchain nodes 104 in the blockchain network 112, the PBFT (Practical Byzantine Fault Tolerant) algorithm or its variants could be employed. One consideration is the ability to achieve blockchain transaction 108 finality, which is critical in providing assurance in a competitive network. Sensitive booking information (e.g. supplier, customer, or pricing details) is saved in the private state database which is privy only to the transacting party and potentially regulators, while a record of these private transactions is recorded as hashes on the blockchain. Blockchain peers or nodes which are not privy to the sensitive booking information will only store hashes and not have access to the sensitive booking information. A third party logistics provider 104A or the rental asset consumer 116 should be able to view his/her own bookings/reservations and as well as available resources/facilities 104B. A smart locker or rental asset provider 104B should be able to view all of his/her own provided facilities/resources as well as bookings/reservations of his/her own facilities/resources.

The shared ledger 146 may include one or more items for each rental transaction. An asset identifier 152 uniquely identifies each rental asset with one or more of a name and an asset description and category. Asset status 156 provides an indication of the rental asset is currently available or in-use. Asset pricing 160 identifies current pricing applied to the rental asset. Asset location 164 identifies the location for the rental asset, and in some embodiments identifies a current location if the rental asset is movable. Some types of rental assets, including a rental space in a building, are not movable and the asset location 164 may not change. Consumer information 168 may be provided in order to identify the consumer 116 or requesting blockchain node 104A which actually uses the rental asset. Consumer information 168 may include one or more of a name, a customer number, or an address.

Figure 2A:
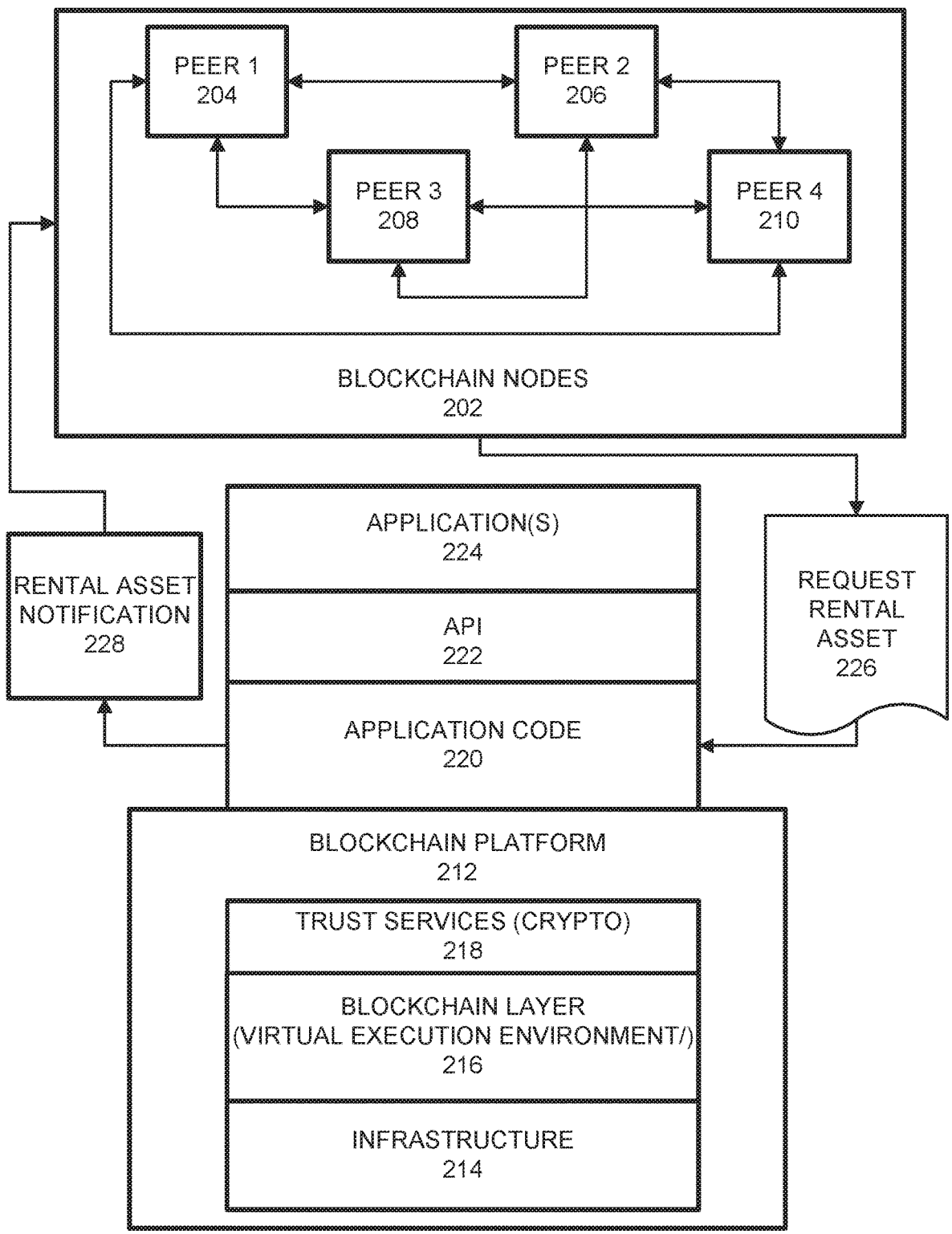
FIG. 2A illustrates an example peer node blockchain architecture configuration for a rental asset sharing scenario, according to example embodiments.

FIG. 2A illustrates an example peer node blockchain architecture configuration for a rental asset sharing scenario, according to example embodiments. Referring to FIG. 2A, the blockchain architecture 200 may include certain blockchain elements, for example, a group of blockchain nodes 202. The blockchain nodes 202 may include one or more nodes 204-210 (four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This may be deployed as a transaction and installed, via appending to the distributed ledger, on all blockchain nodes 204-210. In one embodiment, the blockchain nodes 202 may be located on the blockchain platform 212.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, a rental asset request 226 may be processed by one or more processing entities (e.g., virtual machines) included in the blockchain layer 216. The rental asset notification 228 may include an indication the rental asset is available from a providing node 104B as well as an asset request blockchain transaction 426. The physical infrastructure 214 may be utilized to retrieve any of the data or information described herein.

Within chaincode, a smart contract may be created via a high-level application and programming language, and then written to a block in the blockchain. The smart contract may include executable code that is registered, stored, and/or replicated with a blockchain (e.g., distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, and then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, a requesting blockchain node 104A or an external consumer 116 outside the blockchain network 112 requests a rental asset 226. One function may be to provide a rental asset notification 228, which may be provided to one or more of the nodes 204-210.

Figure 2B:
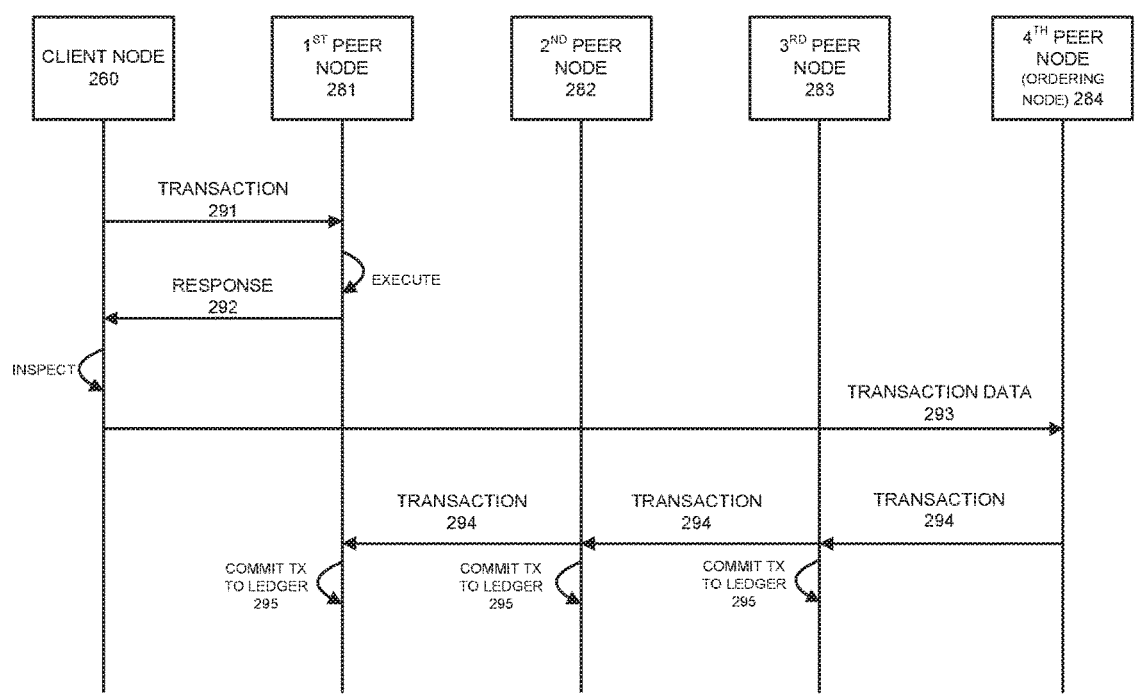
FIG. 2B illustrates an example peer node blockchain configuration, according to example embodiments.

FIG. 2B illustrates an example peer node blockchain configuration, according to example embodiments. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260, which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
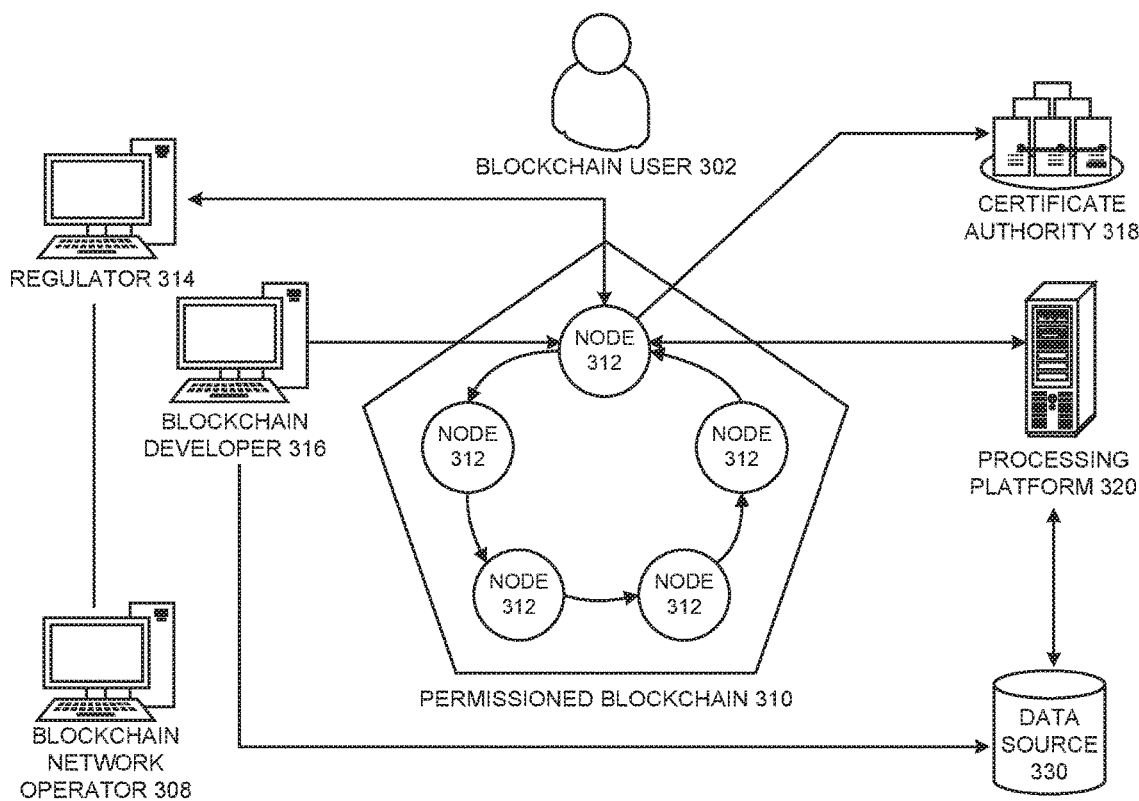
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
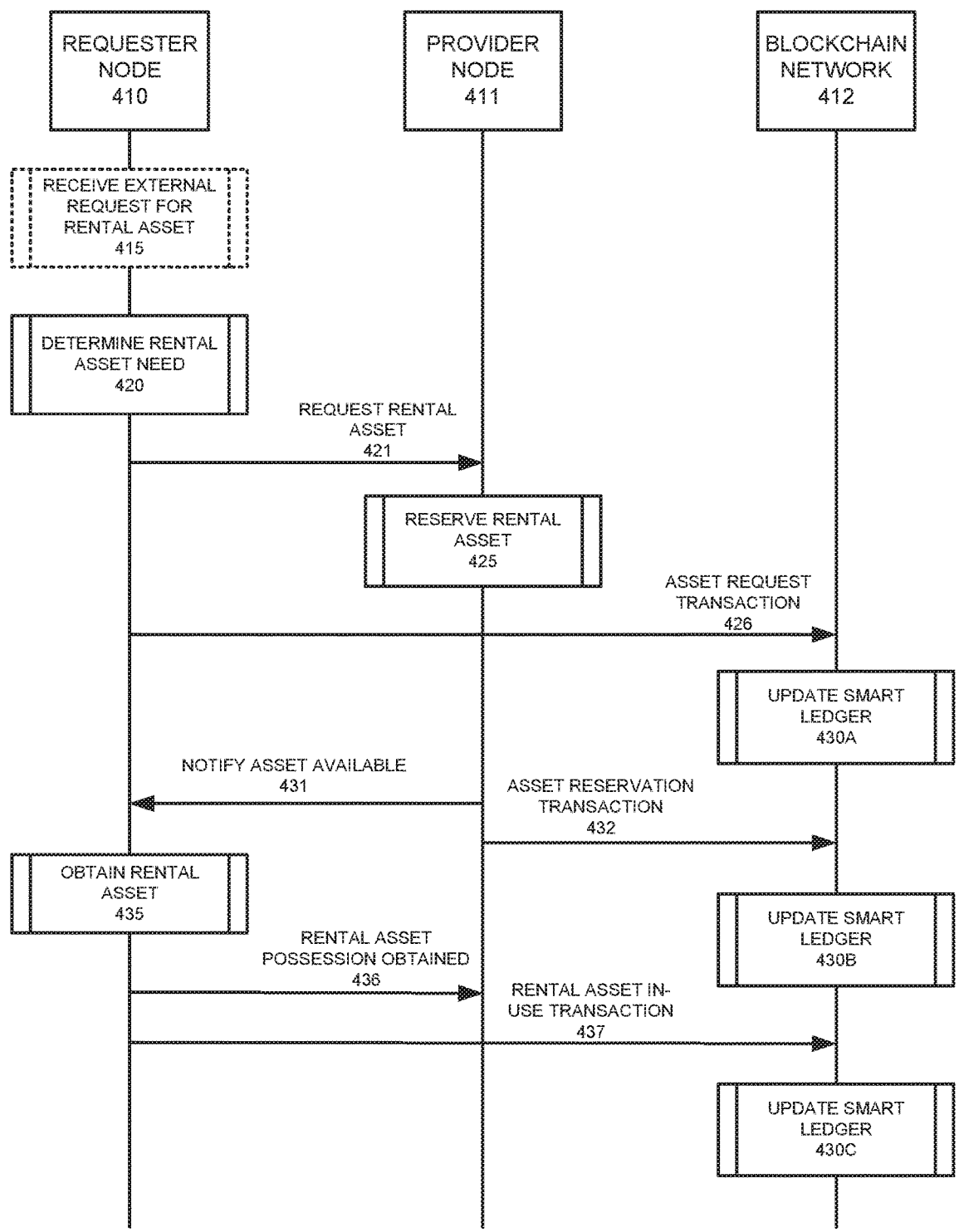
FIG. 4 illustrates a system messaging diagram for performing rental asset management in a blockchain, according to example embodiments.

FIG. 4 illustrates a system messaging diagram 400 for performing rental asset management in a blockchain, according to example embodiments. Referring to FIG. 4, the system diagram 400 includes a requester node 410, a provider node 411, and a blockchain network 412. The requester node 410 is the requesting blockchain node 104A and the provider node 411 is the blockchain node 104B that provides the rental asset.

In some embodiments, the requester node 410 optionally receives an external request for a rental asset 415. This may occur, for example, if the user of the rental asset is external to the blockchain network 412 such as a consumer 116 of FIG. 1A that provides an order 120 to a rental asset requester node 104A. Regardless of whether the requester node 410 receives an external request for a rental asset 415 or is the originator for a rental asset request, the requester node 410 determines that a rental asset is needed 420. The requester node 410 provides a rental asset request 421 to the provider node 411, and generates an asset request blockchain transaction 426 to the blockchain network 412. The provider node 411, in response, reserves the rental asset 425. Nodes of the blockchain network 412 validate the asset request transaction 426, and update the smart ledger 430A with the transaction information. This creates an immutable record of the transaction 426.

Next, the provider node 411 provides a notification to the requester node 410 that the rental asset is available 431. In embodiments where the actual requester is external to the blockchain network 412, the requester node 410 may provide a notification to a consumer 116 that the rental asset is available. The provider node 411 also generates an asset reservation blockchain transaction 432 to the blockchain network 412. Nodes of the blockchain network 412 validate the asset reservation transaction 432, and update the smart ledger 430B with the transaction. This creates an immutable record of the blockchain transaction 432.

After receiving the notification the rental asset is available 431, the requester node 410 or the consumer 116 (whichever is the origin of the request) obtains and utilizes the rental asset 435. The requesting node 410 or consumer 116 then takes physical possession of the rental asset 436. In order to communicate this, a rental asset in-use blockchain transaction 437 is created by the requesting node 410. Nodes of the blockchain network 412 validate the rental asset in-use transaction 437, and update the smart ledger 430C with the transaction. This creates an immutable record of the transaction 437.

Figure 5A:
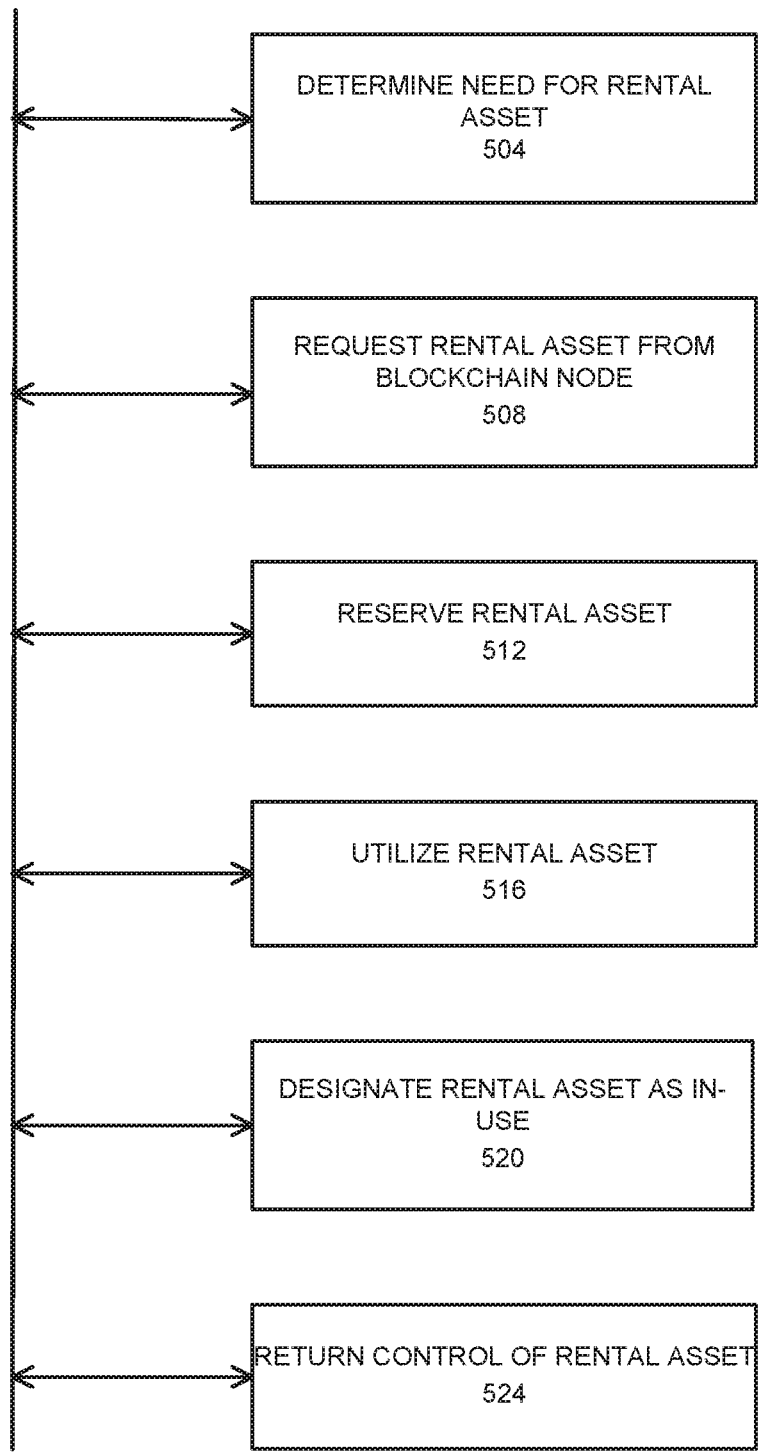
FIG. 5A illustrates a flow diagram of an example method of reserving and utilizing a rental asset in a blockchain, according to example embodiments.

FIG. 5A illustrates a flow diagram 500 of an example method of reserving and utilizing a rental asset in a blockchain, according to example embodiments. Referring to FIG. 5A, the method 500 may include determining a need for a rental asset 504. In some embodiments, the entity in need of rental assets is a blockchain node 104A. In other embodiments, the entity in need of rental assets is not a blockchain node 104A, and is instead outside of a blockchain network 112, such as a consumer 116.

At block 508, the rental asset requester blockchain node 104A requests a rental asset from a rental asset provider blockchain node 104B. In one embodiment, the rental asset is requested from a single blockchain node 104B. In another embodiment, the rental asset is requested from multiple blockchain nodes 104B. Blockchain nodes 104B are rental asset providers, and one or more rental asset providers 104B have available rental assets.

At block 512, a rental asset provider 104B reserves a requested rental asset. By reserving a rental asset, the rental asset provider 104B assigns the rental asset to the requesting rental asset requester 104A, thus preventing other potential rental asset requesters 104 or consumers 116 from reserving the rental asset. This assures the requesting blockchain node 104A that the rental asset will be available according to terms of the rental transaction as detailed in the smart contract 130 and smart ledger 146.

At block 516, the rental asset is utilized by the renting requester 104A or consumer 116. Depending on the type of rental asset, usage may include any of consuming, occupying, removing, transferring, or any other activity appropriate to the nature or actual definition of the rental asset.

At block 520, the rental asset is designated as in-use. In one embodiment, the requester blockchain node 104A designates the rental asset as in-use. In another embodiment, the provider blockchain node 104B designates the rental asset as in-use. Because designating the rental asset as in-use is a blockchain transaction 108, a blockchain node 104 must perform the designation activity.

Finally, at block 524, control of the rental asset is returned to the provider blockchain node 104B. At this point, the rental asset may be reserved to a different requesting entity 104A, 116. In one embodiment, the requester blockchain node 104A that reserved the rental asset returns control of the rental asset to the provider blockchain node 104B. In another embodiment, the provider blockchain node 104B that provided the rental asset returns control of the rental asset to the provider blockchain node 104B.

Figure 5B:
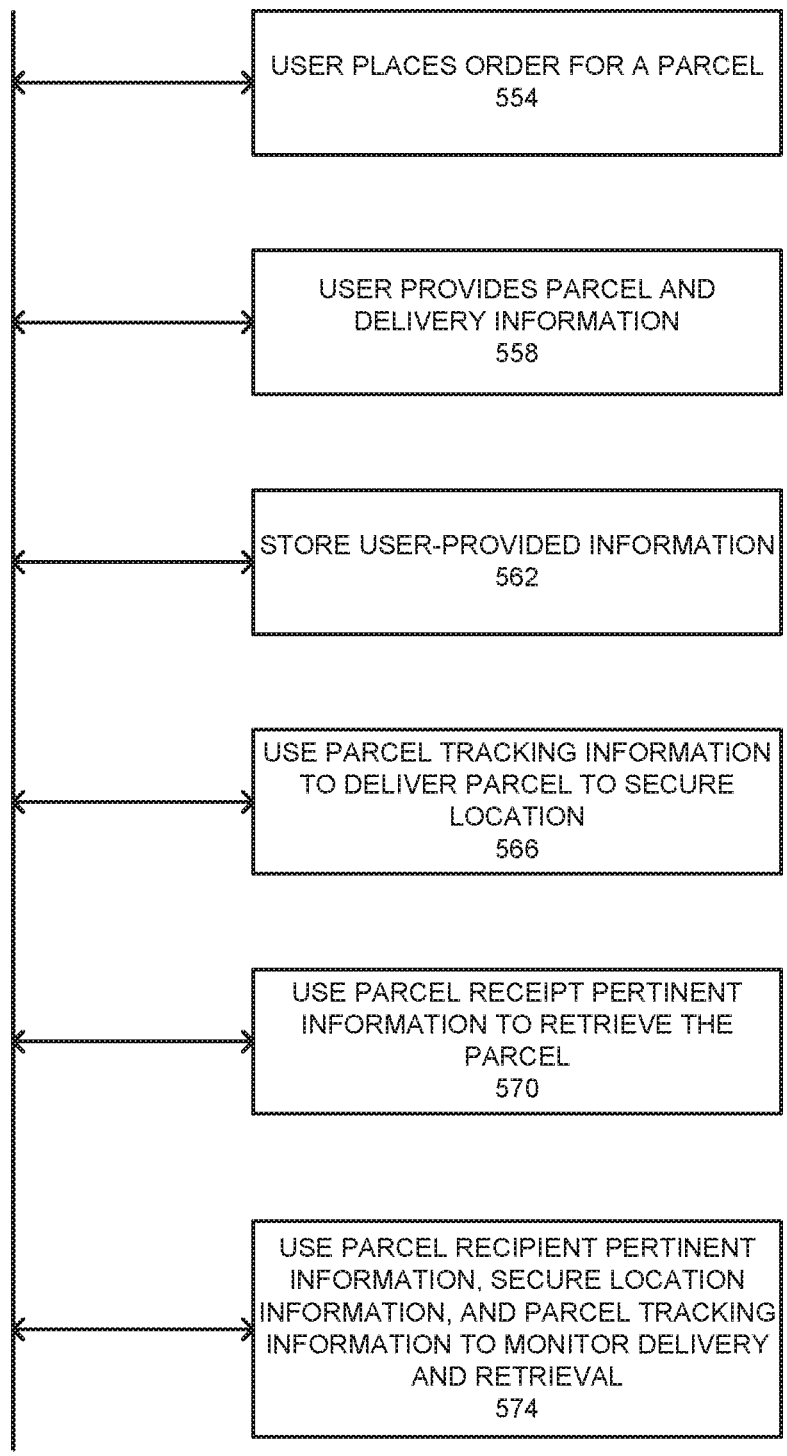
FIG. 5B illustrates a flow diagram of an example method of parcel delivery and tracking, according to example embodiments.

FIG. 5B illustrates a flow diagram 550 of an example method of parcel delivery and tracking, according to example embodiments. In some embodiments, the present application relates to rental assets for storage and retrieval of parcels. Although dedicated rental assets may be suitable for off-peak parcel traffic, at peak times, such assets may be completely utilized, resulting in a shortage of storage asset rental resources for parcels.

The method may also include a user placing an order for a parcel 554. A typical online product ordering, delivering and pick-up scenario first requires a user to access, via a computer (e.g., a workstation, a laptop, a handheld device such as a Palm™ pilot, a cell phone, etc.) an e-commerce site to as to initiate a product order or transaction. While logged onto the website, the user selects a product to be ordered and, before, during or after such selection, provides, at the website, parcel and delivery information 558 (e.g., e-mail address, pickup address, etc.). Still at the website, the user can provide or select a desirable pick-up location from a number of potential locations provided. Alternatively, the specific pick-up location can be determined or assigned by the website in an automated fashion, requiring no selection by the user, but only the entry of a pick-up address. In one embodiment, the location is assigned using information stored in a back office or remote database(s), with the assigned location selected based on proximity to the desired pick-up location. As a practical matter, locations are representative only and any number of similar locations can be included as part of the network. It is contemplated that a site can be, in addition to a website, a brick and mortar (i.e., physical) store or retailer, a catalogue-type retailer, or a television retailer. The user-provided information is then stored 562.

The e-commerce site notifies the delivery service or company (e.g., U.S. Postal Service, UPS™, FedEX™, Cf™ and the like) that a parcel requires shipment and delivery to the specified delivery location and the location is provided to the service or company. Physical parcel delivery then can take place, with parcel tracking information used to deliver the parcel to a secure location 566. In some embodiments, a data center may be used to monitor, preferably via a virtual private network ("VPN"), delivery (and subsequent pick-up) of the parcel. Security precautions, such as a firewall, can be used to protect databases in the data center. Once proper delivery has occurred, notification can be sent from data center to the site, which in turn can forward such notification to the computer (e.g., via e-mail). The user, in an alternative embodiment, can access parcel tracking information directly from a shipper via the computer. Physical pick-up by user, or the user's authorized agent, can then occur. Parcel receipt-pertinent information 570 is then used to retrieve the parcel, and such information along with secure location information and parcel tracking information may be used to monitor delivery and retrieval 574.

Internet connections (e.g., DSL, Tl, cable, satellite, etc.) may be used, including e-mail. The present invention may be considered and may be implemented as a parcel storage system, a method of securing a parcel for delivery and retrieval, a secure product procurement method, a method of receiving parcel packages, a method of sending parcel packages, a method of online delivery to a kiosk, a delivery network, an Internet delivery system, a method of providing delivery data for a parcel package, a delivery kiosk system, a Graphic User Interface (GUI) for a delivery kiosk system, a final mile delivery solution, a final mile solution for transporting goods to an end user, a method of delivery for use by a shipping service, a parcel delivery system for use by a shipping service, a parcel delivery kiosk for use by a shipping service, a secure storage locker for picking up parcels delivered to the locker by a shipping service, a secure, e-commerce transportation, information, and logistics solutions for at least one of delivery and pick-up of parcel packages, as well as an online shipping solution, among others.

Figure 6A:
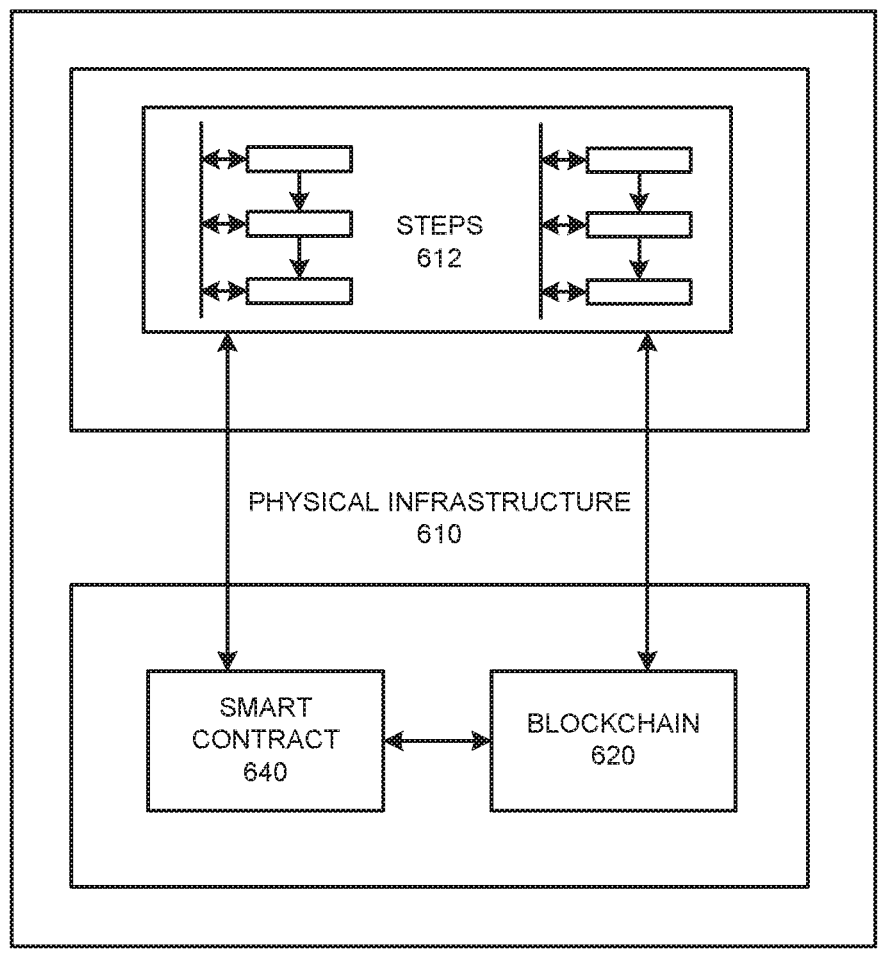
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
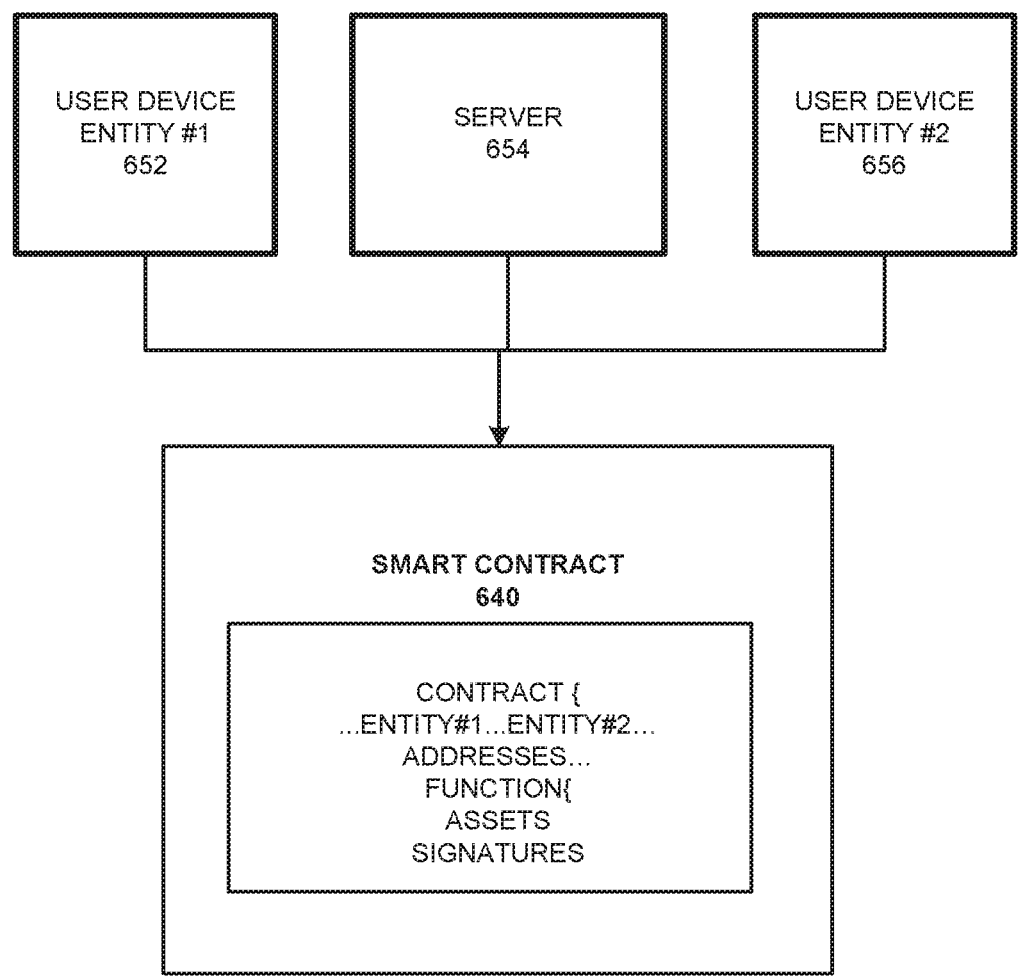
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

Figure 6C:
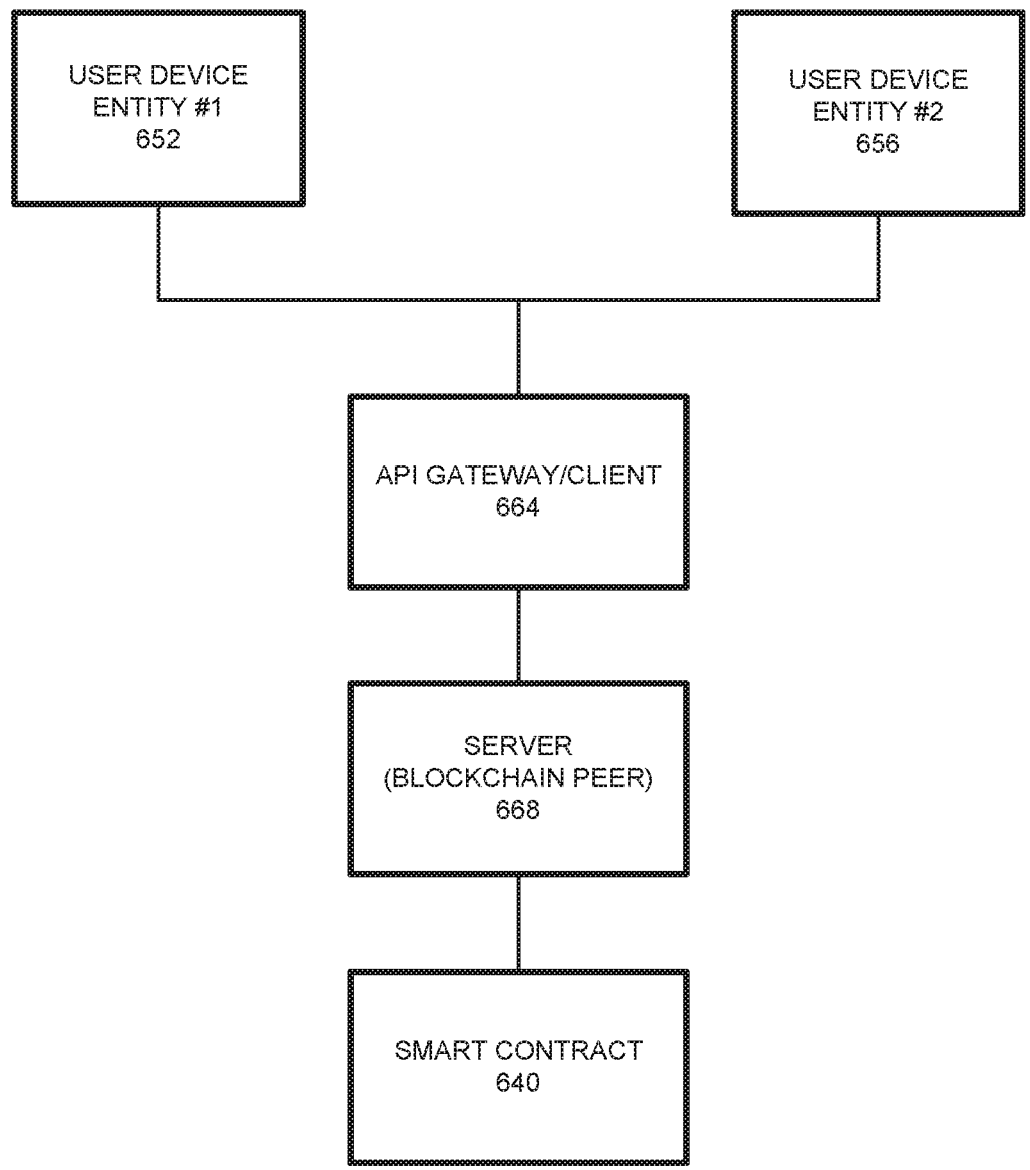
FIG. 6C illustrates an example smart contract configuration among contracting parties and a server configured to enforce smart contract terms on a blockchain, according to example embodiments.

FIG. 6C illustrates an example smart contract configuration among contracting parties and a server configured to enforce the smart contract terms on the blockchain according to example embodiments. Referring to FIG. 6C, the configuration 660 may represent a communication session, an asset transfer session or a process or procedure that is driven by a smart contract 640 which explicitly identifies one or more user devices 652 and/or 656. The smart contract 640, also called chaincode, is business logic which is coded and deployed into the blockchain peers that are required to run and endorse any transaction/logic that requires an update to the world state.

The execution, operations and results of the smart contract execution may be managed by a server 668. Blockchain network component store a copy of the world state, allowing clients to query data on the world state as well as submit transactions into the blockchain network where, depending on the smart contract 640 and endorsement policy, endorsing peers will run the smart contracts 640. Content of the smart contract 640 may require digital signatures by one or more of the entities 652 and 656 which are parties to the smart contract transaction. The results of the smart contract execution may be written to a blockchain as a blockchain transaction. An API Gateway/Client 664 represents a middleware application/interface providing a common interface to access business logic/data as well as the interface to perform transactions (invoke and queries) on the blockchain by connecting to one of the peers in the blockchain network.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
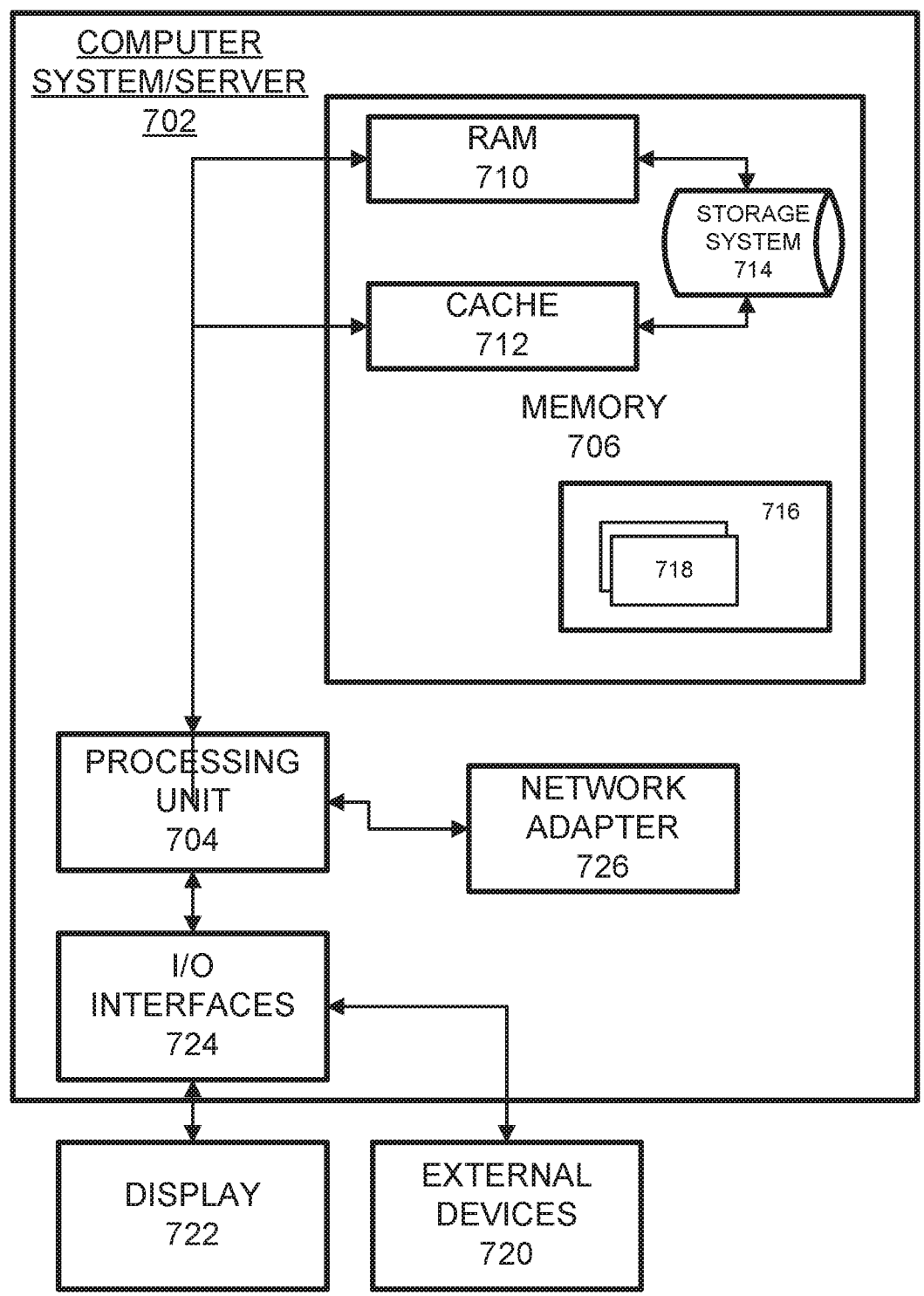
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising: storing a key-value pair within a world state database of a shared blockchain ledger of a blockchain network, where the key-value pair identifies a total amount of assets of an asset type that are currently reserved by an aggregate of a plurality of blockchain nodes of the shared blockchain ledger; reserving, by a first blockchain node of the blockchain network, use of an asset of the asset type from a second blockchain node; generating a blockchain transaction comprising sensitive details about reserving the use of the asset; generating a hash of the blockchain transaction which proves the reserving of the use of the asset and hides the sensitive details stored within the blockchain transaction; changing a value of the key-value pair previously stored within the world state database which identifies the total amount of assets of the asset type that are currently reserved based on the reserved use of the asset of the asset type; and storing the sensitive details of the blockchain transaction in a private blockchain ledger that is shared between the first and second blockchain nodes but not shared with other blockchain nodes of the shared blockchain ledger and simultaneously storing the hash of the blockchain transaction on the shared blockchain ledger which comprises proof of the sensitive details stored in the private blockchain ledger and proof of the change in the value of the key-value pair within the world state database.

2. The method of claim 1, wherein the sensitive details about reserving the use of the asset which are hidden comprise a price value of the reservation of the asset and a customer name of a user that reserved the asset.

3. The method of claim 1, further comprising generating and storing a second transaction on the shared blockchain ledger designating the asset as in-use.

4. The method of claim 1, further comprising:
executing a smart contract that generates the sensitive details and which is mutually agreed to by the first and second blockchain nodes, in response to the first blockchain node requesting use of the asset.

5. The method of claim 1, wherein the private blockchain ledger between the first and second blockchain nodes is accessible to and regulated by one or more regulator nodes of the blockchain network.

6. A system, comprising: a processor configured to store a key-value pair within a world state database of a shared blockchain ledger of a blockchain network, where the key-value pair identifies a total amount of assets of an asset type that are currently reserved by an aggregate of a plurality of blockchain nodes of the shared blockchain ledger, reserve, via a first blockchain node of the blockchain network, use of an asset of the asset type from a second blockchain node, generate a blockchain transaction comprising sensitive details about reserving the use of the asset, generate a hash of the blockchain transaction which proves the reserving of the asset and hides the sensitive details stored within the blockchain transaction; change a value of the key-value pair previously stored within the world state database which identifies the total amount of assets of the asset type that are currently reserved based on the reserved use of the asset of the asset type; and store the sensitive details of the blockchain transaction in a private blockchain ledger that is shared between the first and second blockchain nodes but not shared with other blockchain nodes of the shared blockchain ledger and simultaneously store the hash of the blockchain transaction on the shared blockchain ledger which comprises proof of the sensitive details stored in the private blockchain ledger and proof of the change in the value of the key-value pair within the world state database.

7. The system of claim 6, wherein the sensitive details about reserving the use of the asset which are hidden comprise a price value of the reservation of the asset and a customer name of a user that reserved the asset.

8. The system of claim 6, wherein the processor is further configured to generate a store a second transaction on the shared blockchain ledger which designates the asset as in-use.

9. The system of claim 6, wherein the processor is further configured to execute a smart contract that generates the sensitive details and which is mutually agreed to by the first and second blockchain nodes, in response to the first blockchain node request use of the asset.

10. The system of claim 6, wherein the private blockchain ledger between the first and second blockchain nodes is accessible to and regulated by one or more regulator nodes of the blockchain network.

11. A non-transitory computer readable medium comprising instructions, that when read by a processor, cause the processor to perform: storing a key-value pair within a world state database of a shared blockchain ledger of a blockchain network, where the key-value pair identifies a total amount of assets of an asset type that are currently reserved by an aggregate of a plurality of blockchain nodes of the shared blockchain ledger; reserving, by a first blockchain node of the blockchain network, use of an asset of the asset type from a second blockchain node; generating a blockchain transaction comprising sensitive details about reserving the use of the asset; generating a hash of the blockchain transaction which proves the reserving of the use of the asset and hides the sensitive details stored within the blockchain transaction; changing a value of the key-value pair previously stored within the world state database which identifies the total amount of assets of the asset type that are currently reserved based on the reserved use of the asset of the asset type; and storing the sensitive details of the blockchain transaction in a private blockchain ledger that is shared between the first and second blockchain nodes but not shared with other blockchain nodes of the shared blockchain ledger and simultaneously storing the hash of the blockchain transaction on the shared blockchain ledger which comprises proof of the sensitive details stored in the private blockchain ledger and proof of the change in the value of the key-value pair within the world state database.

12. The non-transitory computer readable medium of claim 11, wherein the sensitive details about reserving the use of the asset which are hidden comprise a price value of the reservation of the asset and a customer name of a user that reserved the asset.

13. The non-transitory computer readable medium of claim 11, further comprising generating and storing a second transaction on the shared blockchain ledger designating the asset as in-use.

14. The non-transitory computer readable medium of claim 11, further comprising:
   executing a smart contract that generates the sensitive details and which is mutually agreed to by the first and second blockchain nodes, in response to the first blockchain node requesting use of the asset.

15. The non-transitory computer readable medium of claim 11, wherein the private blockchain ledger between the first and second blockchain nodes is accessible to and regulated by one or more regulator nodes of the blockchain network.

\* \* \* \* \*